(12) United States Patent
Cossette et al.

(10) Patent No.: US 7,044,037 B2
(45) Date of Patent: May 16, 2006

(54) TIP FOR DEMOLITION AND CONSTRUCTION EQUIPMENT

(75) Inventors: Marc A. Cossette, Poland, OH (US); John R. Ramun, 8243 N. Lima Rd., Poland, OH (US) 44514

(73) Assignee: John R. Ramun, Poland, OH (US)

( * ) Notice: Subject to any disclaimer, the term of this patent is extended or adjusted under 35 U.S.C. 154(b) by 56 days.

(21) Appl. No.: 10/829,147

(22) Filed: Apr. 21, 2004

(65) Prior Publication Data

US 2005/0235498 A1    Oct. 27, 2005

(51) Int. Cl.
*B02C 1/06*    (2006.01)
(52) U.S. Cl. .............................. 83/13; 30/134; 30/228; 241/266
(58) Field of Classification Search ................ 30/134, 30/228; 83/13; 241/101.73, 266
See application file for complete search history.

(56) References Cited

U.S. PATENT DOCUMENTS

| 4,403,431 A | 9/1983 | Ramun et al. |
| 4,670,983 A | 6/1987 | Ramun et al. |
| 4,897,921 A | 2/1990 | Ramun |
| 5,044,569 A | 9/1991 | La Bounty et al. |
| 5,187,868 A | 2/1993 | Hall et al. |
| 5,209,611 A | 5/1993 | Drescher et al. |
| 5,339,525 A | 8/1994 | Morikawa et al. |
| 5,894,666 A * | 4/1999 | Hrusch ........................ 30/134 |
| 5,926,958 A | 7/1999 | Ramun |
| 5,940,971 A | 8/1999 | Ramun |
| 5,992,023 A | 11/1999 | Sederberg et al. |
| 6,061,911 A | 5/2000 | La Bounty et al. |
| 6,119,970 A | 9/2000 | La Bounty et al. |
| 6,202,308 B1 * | 3/2001 | Ramun ........................ 30/134 |
| 6,438,874 B1 | 8/2002 | La Bounty et al. |
| 6,839,969 B1 * | 1/2005 | Jacobson et al. ............. 30/134 |
| 6,926,217 B1 | 8/2005 | LaBounty et al. |

FOREIGN PATENT DOCUMENTS

| DE | 1278 375 | 9/1968 |
| DE | 102 43308 | 4/2004 |
| EP | 0666 131 | 8/1995 |
| JP | 55 104656 | 8/1980 |
| JP | 08 206910 | 8/1996 |

OTHER PUBLICATIONS

Genesis, XP Mobile Sheers, Product Advertisement, dated Apr., 2003.

* cited by examiner

*Primary Examiner*—Charles Goodman
(74) *Attorney, Agent, or Firm*—The Webb Law Firm (57) ABSTRACT

A tip for demolition and construction equipment has a discrete base with at least one recess therein to accept a replaceable insert. The insert has a projection that fits within a mating socket within the base. A threaded bolt may extend through a common bore within the insert and base to secure the insert to the base. The tip may also include a second opposing insert which is held within a respective recess by a common bolt.

16 Claims, 7 Drawing Sheets

TIP FOR DEMOLITION AND CONSTRUCTION EQUIPMENT

BACKGROUND OF THE INVENTION

1. Field of the Invention

The present invention relates to a tip used for construction or demolition equipment which is adapted to be attached to a support and used in conjunction with, for example, a heavy-duty metal cutting shear, a plate shear, a concrete crusher, a grapple or other construction or demolition equipment. More particularly, the present invention relates to a replaceable tip secured to a support.

2. Description of Related Art

For purposes of discussion herein, demolition and construction equipment may also be referred to as scrap handling equipment. The description of demolition equipment and construction equipment herein is not intended to be restrictive of the equipment being referenced. Demolition equipment, such as heavy-duty metal cutting shears, grapples and concrete crushers are mounted on backhoes powered by hydraulic cylinders for a variety of jobs in the demolition field. This equipment provides for the efficient cutting and handling of scrap. For example, in the dismantling of an industrial building, metal scrap, in the form of various diameter pipes, structural I-beams, channels, angles, sheet metal plates and the like must be efficiently severed and handled by heavy duty metal shears. Such shears can also be utilized for reducing automobiles, truck frames, railroad cars and the like. The shears must be able to move and cut the metal scrap pieces regardless of the size or shape of the individual scrap pieces and without any significant damage to the shears. In the demolition of an industrial building, concrete crushing devices, such as a concrete pulverizer or concrete crackers, are also used to reduce the structure to manageable components which can be easily handled and removed from the site. Wood shears and plate shears also represent specialized cutting devices useful in particular demolition or debris removal situations depending on the type of scrap. Also, a grapple is often utilized where handling of debris or work pieces is a primary function of the equipment. Historically, all of these pieces of equipment represent distinct tools having significant independent capital cost. Consequently, the demolition industry has tended to develop one type of tool that can be used for as many of these applications as possible.

For illustrative purposes, the following discussion will be directed to metal shears. One type of metal shear is a shear having a fixed blade and a movable blade pivoted thereto. The movable blade is pivoted by a hydraulic cylinder to provide a shearing action between the blades for severing the work pieces. Examples of this type of shears can be found in prior U.S. Pat. Nos. 4,403,431; 4,670,983; 4,897,921; 5,926,958; and 5,940,971 which are assigned to the assignee of this application and which are herein incorporated in their entirety by reference.

Figure 1:
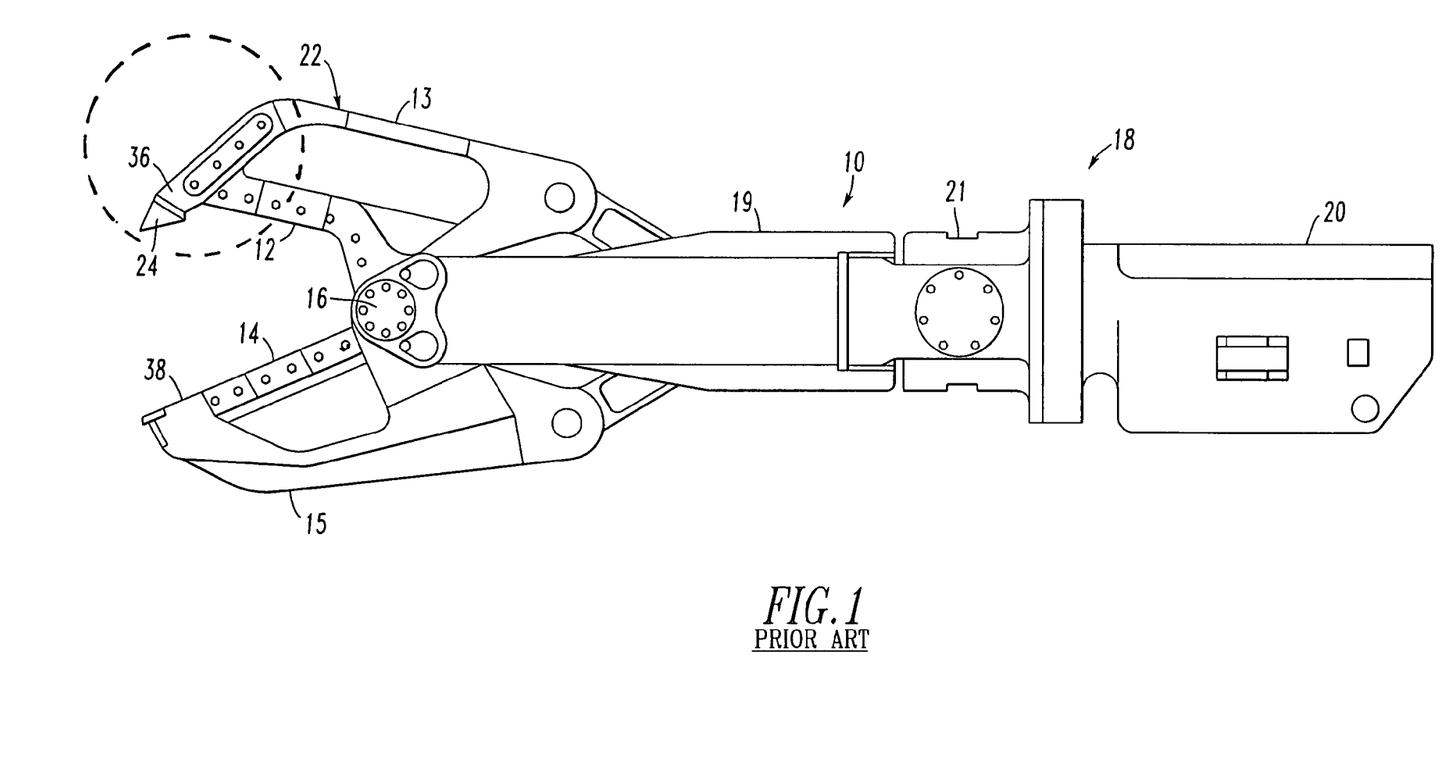
FIG. 1 is prior art and is a side view illustrating a metal shear incorporated into a universal body for a construction tool system.

FIG. 1 illustrates a prior art, multiple tool attachment adapted to be attached to demolition or construction equipment, such as a backhoe (not shown). The multiple tool attachment is adapted to connect one of a series of tools or tool units to the demolition equipment. The tool attached in FIG. 1 is a metal shear 10. The shear 10 includes a first blade 12 connected to an upper jaw 13 and a second blade 14 connected to a lower jaw 15, wherein the jaws 13,15 are pivotally connected at a hub or main pin 16 to a universal body 18. The body 18 is referred to as universal because it remains common to a series of tools or tool units in the attachment system. The universal body 18 is comprised of sides 19, a bearing housing 20 and a yoke 21.

Figure 3:
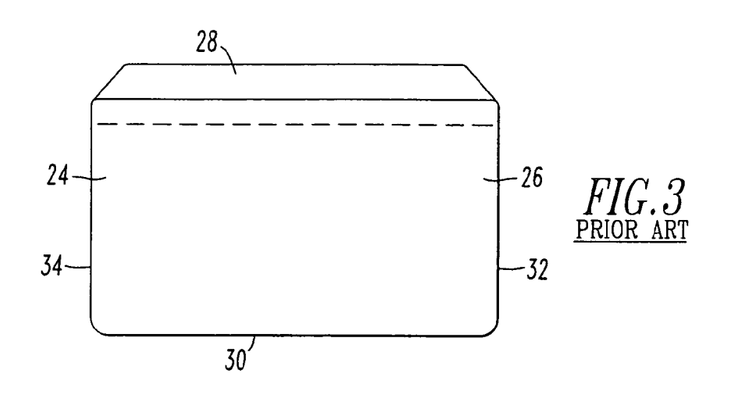
FIG. 3 is prior art and is a front view of a blade tip.
Figure 4:
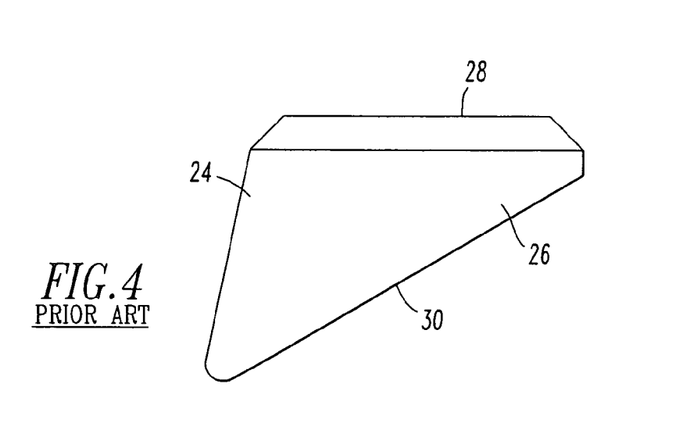
FIG. 4 is prior art and is a side view of the blade tip shown in FIG. 3.

The upper jaw 13 and the lower jaw 15 pivot about the main pin 16 to form a movable jaw assembly 22. At the end of the first blade 12 is a blade tip 24. Details of the blade tip 24 are provided in FIGS. 3 and 4 wherein the blade tip 24 is comprised of a base 26 having a top side 28, bottom side 30 and walls 32,34 therebetween. The base 26 of the blade tip 24 is a completely solid piece and the top side 28 of the base 26 is secured to a support 36 associated with the upper jaw 13.

Figure 2:
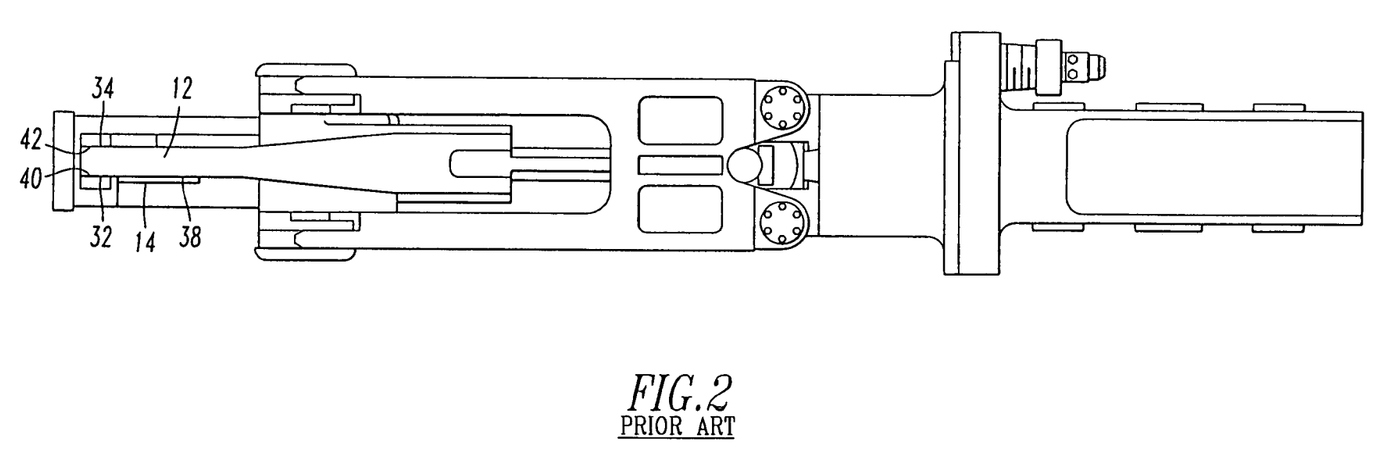
FIG. 2 is prior art and is a plan view of the shear in FIG. 1.

Directing attention to FIGS. 1 and 2 the second blade 14 has associated with it a guide channel 38 which accepts and provides lateral support to the blade tip 24 and the first blade 12. To minimize the deflection experienced under load by the first blade 12 and the blade tip 24, the tolerance for the guide channel 38 is fairly low.

In many applications, the first blade 12 and support 36 may be laterally displaced relative to the guide channel 38 such that upon entering the guide channel 38 the side of the blade tip 24 experiences rubbing and extensive wear during normal operation. This wear if not properly maintained can lead to the first blade 12 becoming jammed or stuck in the guide channel 38. This condition is known as "stickers" in the industry. Stickers can develop when the clearance gap between the walls 32,34 of the tip 24 of the first blade 12 and the walls 40,42 of the guide channel 38 of the lower blade 14 become excessive enough to allow material to become wedged between these surfaces while shearing. Once the first blade 12 becomes stuck within the guide channel 38, the shear 10 must oftentimes be decommissioned for repair. It is then necessary to build up the walls 32,34 of the tip 24 by welding to keep these gaps at a minimum. This process is very time consuming and costly and, depending on the material that the shear is processing, building up the tip could be required as often as once a week.

Therefore, a tip design is desired that may be easily repaired or replaced when worn to minimize the downtime of a shear or other equipment.

SUMMARY OF THE INVENTION

On embodiment of the subject invention is directed to a tip for demolition and construction equipment having a discrete base with a top side, a bottom side and walls therebetween. The base also has a mounting surface on the top side of the base adapted to be secured to a support. The base furthermore has a central portion with a cutting edge, whereby the cutting edge is defined at the lowermost portion of the bottom side of the base. A recess extends into at least one wall of the base and the recess defines a recess upper side, an inner wall and a recess contour. An insert has a top side, a bottom side and walls therebetween with a cutting edge defined at the lowermost portion of the bottom side of the insert and generally aligned with the cutting edge of the base. The insert has a profile which generally conforms to the recess contour. An insert is secured within each recess.

Another embodiment of the subject invention is directed to the inserts which are secured within each base recess.

Yet another embodiment of the subject invention is directed to demolition and construction equipment utilizing such a tip.

Yet another embodiment of the subject invention is directed to a method of securing inserts within a tip for demolition and construction equipment comprising the steps of providing a common bore through the insert and the walls of the base at each recess, positioning an insert within each recess, inserting a fastener therethrough; and securing the fastener against each insert within the recess.

DESCRIPTION OF THE PREFERRED EMBODIMENTS

For purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 5:
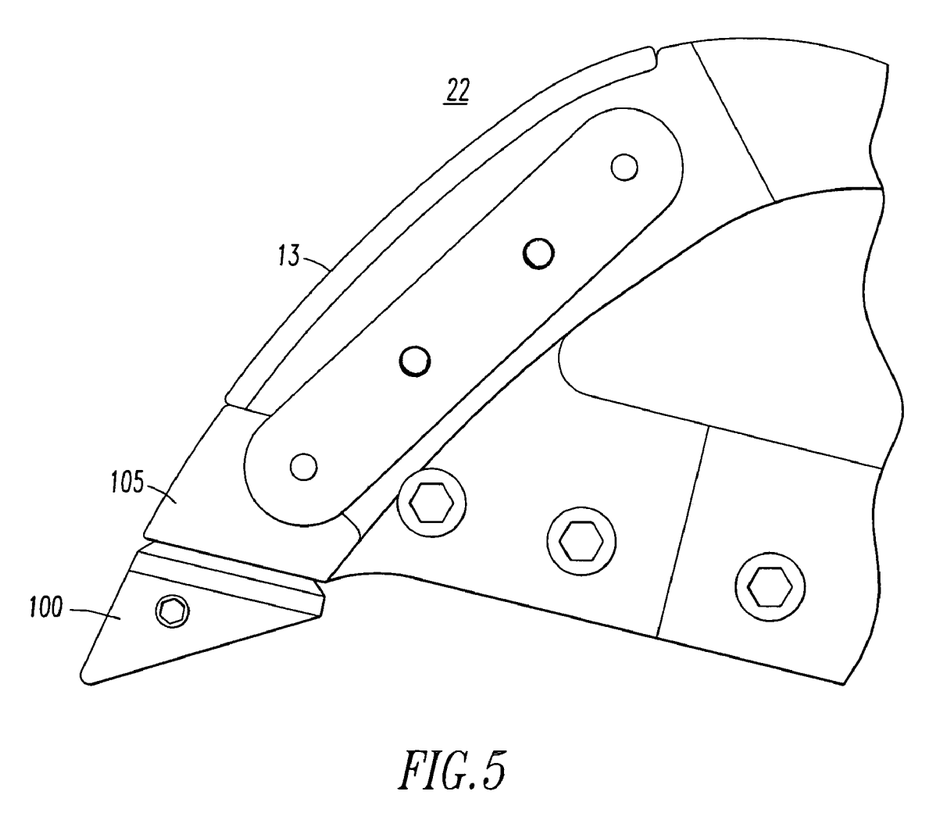
FIG. 5 is an enlarged portion of the encircled section in FIG. 1, however, with the introduction of a blade tip in accordance with the subject invention.

FIG. 5 illustrates a blade tip 100 secured to a support 105 such as the upper jaw 13 of a jaw assembly 22 used in an industrial shear. It should be appreciated that although this tip 100 will be discussed in the context of an industrial shear associated with demolition equipment, it should be appreciated that such a blade tip 100 can be implemented on any type of equipment that shears, cuts, cracks, crunches or processes any type of material by motion of the blade tip.

The blade tip 100 may be utilized, for example, as a shear tip, claw tooth, crusher tooth and any and all piercing/punching devices that currently exist or that may be developed. This tip has immediate applications for products such as shears, claws, grapples, crushers, crackers, rail breakers, multi-blade cutters, tree shears, ripper teeth, grinding teeth, shearing teeth and any mechanism that can utilize a disposable cutting part which is subjected to wear.

Figure 6:
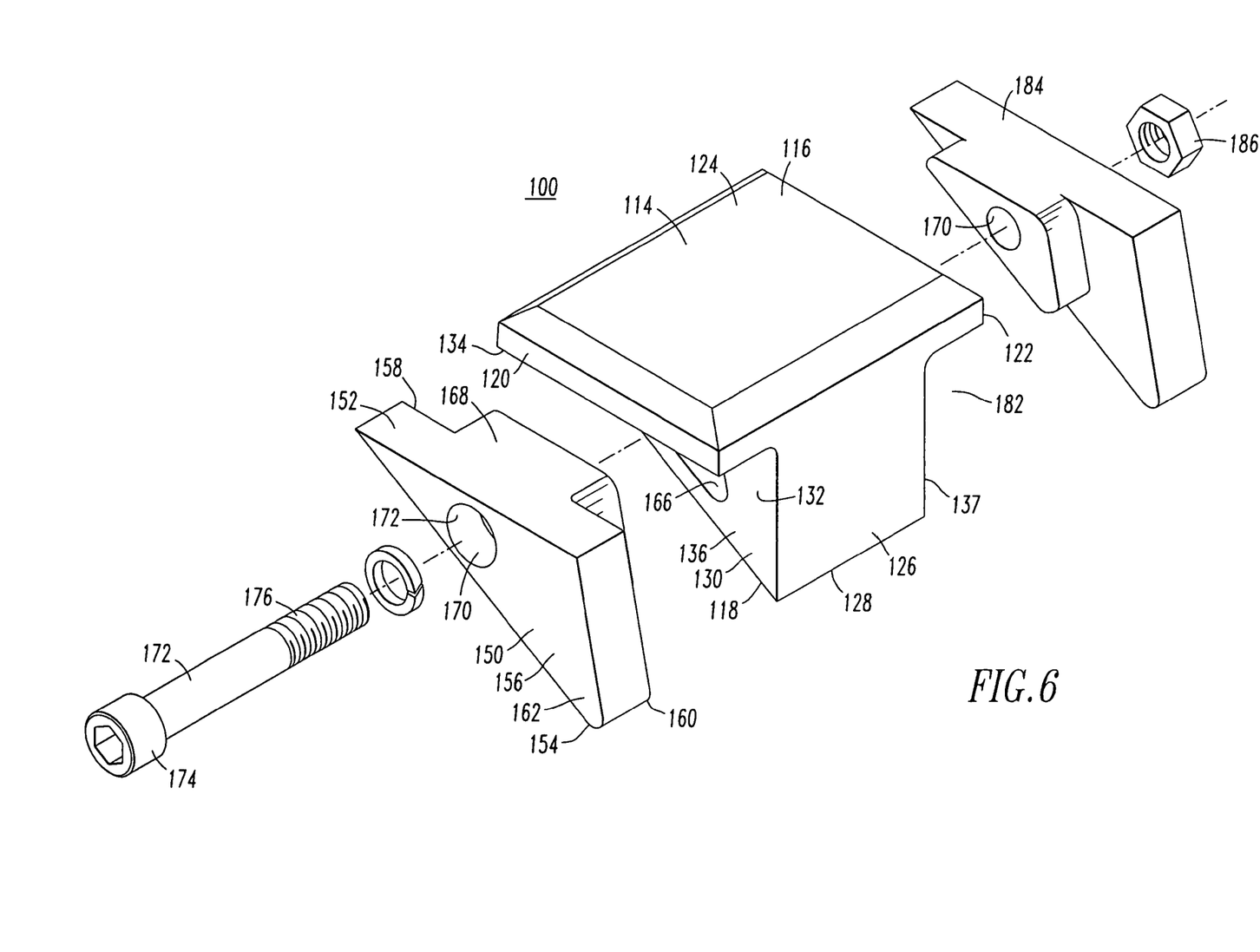
FIG. 6 is an exploded perspective view of the tip illustrated in FIG. 5.
Figure 7:
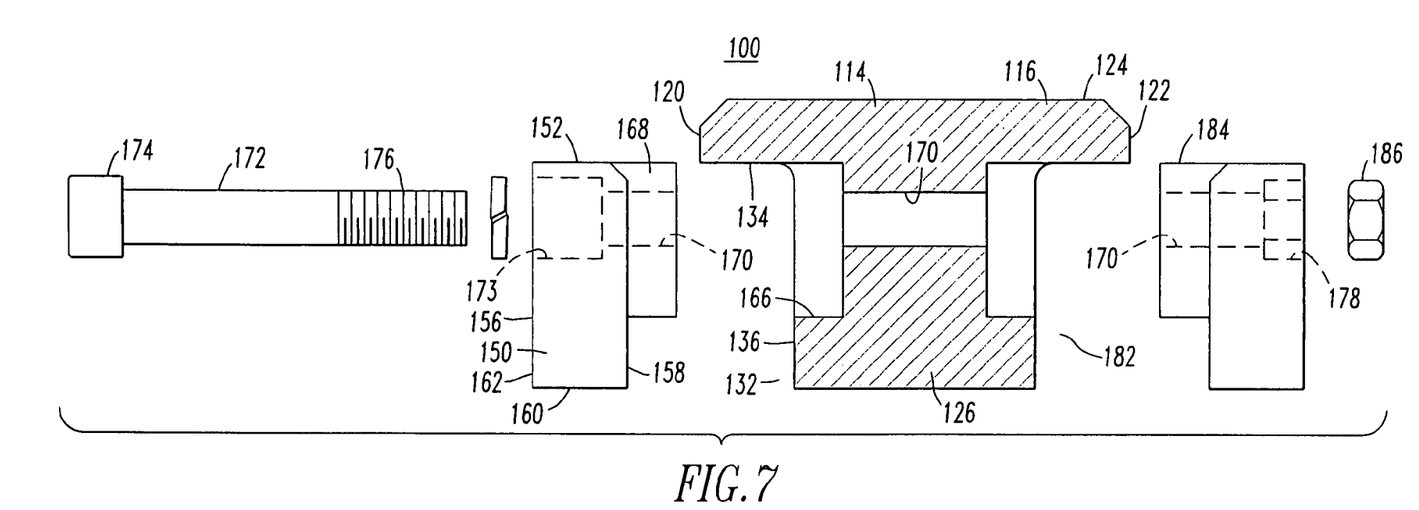
FIG. 7 is an exploded section view of the blade tip wherein one insert has a recess to accept a nut.
Figure 8:
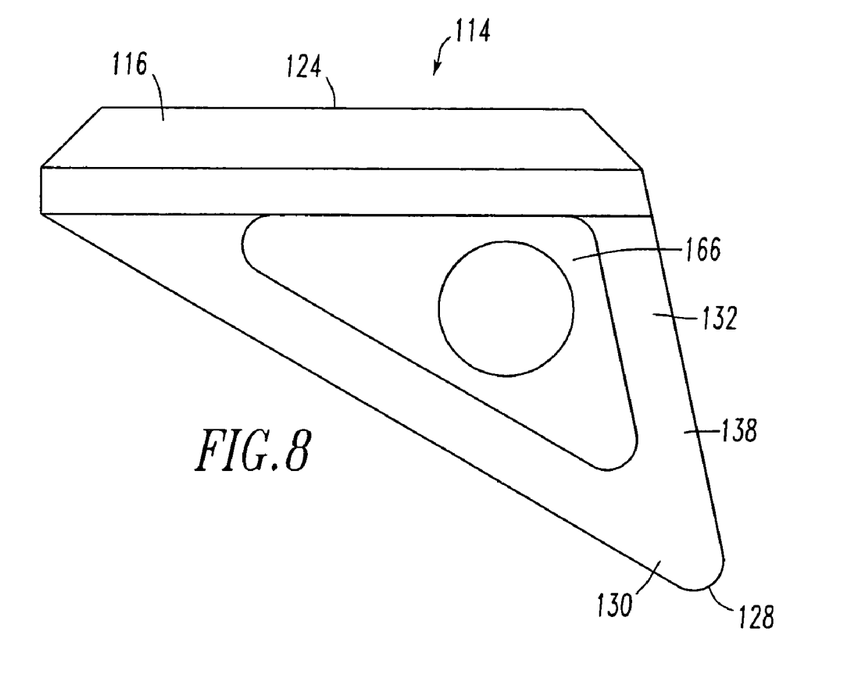
FIG. 8 is a side view of the base associated with the blade tip.

Directing attention to FIGS. 6–9, the tip 100 is comprised of a discrete base 114 having a top side 116, a bottom side 118 and walls 120, 122 therebetween. The base 114 has a mounting surface 124 on the top side 116 wherein the mounting surface 124 is adapted to be secured to the support 105 (FIG. 5). The base 114 has a central portion 126 with a cutting edge 128 whereby the cutting edge 128 is defined at the lowermost portion 130 of the bottom side 118 of the base 114. A recess 132 extends into at least one wall 120, 122 of the base 114. The recess 132 defines a recess upper side 134, a recess inner wall 136 and a recess contour 138 (FIG. 8). A second insert 184 will be described and is secured within a second recess 182.

Directing attention to insert 150, the insert 150 has a top side 152, a bottom side 154 and walls 156, 158 therebetween. A cutting edge 160 is defined at the lowermost portion 162 of the bottom side 154 of the insert 150 and is generally aligned with the cutting edge 128 of the base 114.

Figure 9:
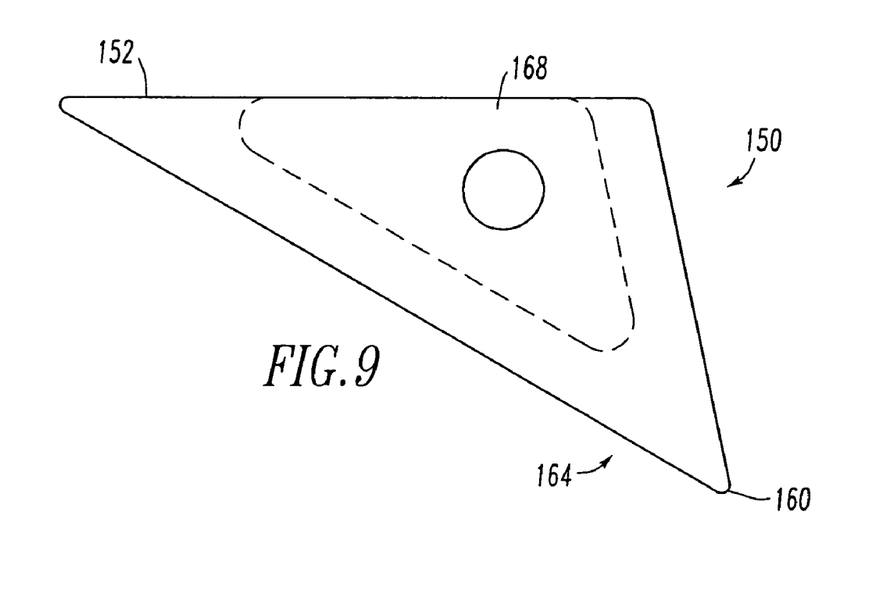
FIG. 9 is a profile of the insert associated with the blade tip.

Directing attention to FIGS. 8 and 9, the profile 164 of the insert 150 generally conforms to the contour 138 of the recess 132. The recess contour 138 is triangular and the profile 164 of the tip 150 corresponds to this shape. The insert 150 is secured within the recess 132. Directing attention to FIG. 7, when the insert 150 is secured within the recess 132, the cutting edge 160 of the insert 150 is in approximate alignment with the cutting edge 128 of the base 114. This is also true for insert 184 within the recess 182.

To provide additional support to the insert 150 within the recess 132, the top side 152 of the insert 150 is positioned against the upper side 134 of the recess 132.

Redirecting attention to FIGS. 6 and 7, the base 114 further includes a socket 166 extending into the inner wall 136 of the recess 132. The insert 150 further includes a projection 168 extending from the wall 158 wherein the projection 168 fits within the socket 166 to support the insert 150 within the recess 132.

As illustrated in FIGS. 8 and 9, the socket 166 and the projection 168 have matching shapes and are noncircular such that when the insert 150 is mounted within the recess 132 there is no relative rotation between the socket 166 and the projection 168.

As illustrated in FIGS. 6 and 7, a common bore 170 extends through the insert 150, the base 114 and the insert 184. A fastener 172 passes through the common bore 170 and secures the inserts 150,184 within their respective recesses 132,182. The fastener 172 may be a threaded bolt having a bolt head 174 and a threaded shaft 176. The bore 170 may include a counter bore 173 within the insert 150 to accept the bolt head 174 and, furthermore, the bore 170 within the base 114 may have threads (not shown) to accept the threaded shaft 176.

While so far only a single recess 132 and a single insert 150 have been discussed in detail, a second recess 182 is associated with the opposite wall 122 of the base 114 and a second insert 184 is secured within the recess 182 in the same fashion as the insert 150 is secured within the recess 132. When the fastener 172 has a bolt head 174 and a threaded shaft 176, the bore 170 of the insert 178 may have a countersink 178 to accept the nut 186 to engage the threaded shaft 176 of the bolt 172.

Figure 10:
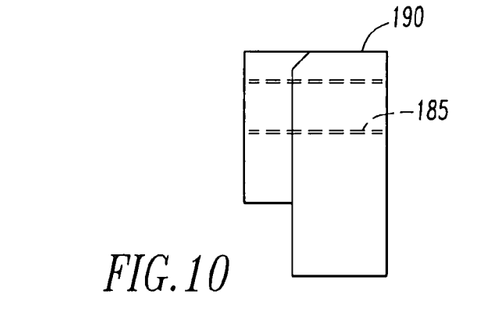
FIG. 10 is a side view of one insert having an internally threaded bore to accept a bolt.

In the alternative, an insert 190 having all of the features of insert 184 with the exception of a countersunk portion of the bore to accept the nut 186 may itself have a threaded bore 185 to accept the threaded shaft 176 of the bolt 172, thereby alleviating the need for the nut 186 and the corresponding countersunk portion within the insert 184 to accommodate the nut 186.

Figure 11:
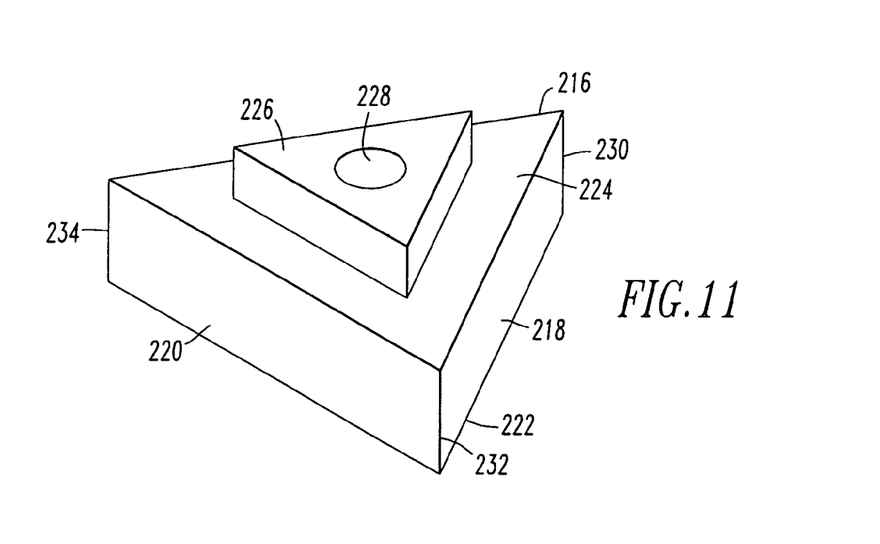
FIG. 11 is a perspective view of an alternate embodiment of an insert which is indexable in accordance with the subject invention.

FIG. 11 illustrates a perspective view of an insert 200 having a top side 216, a bottom side 218 and an additional third side 220 with walls 222, 224 therebetween. Extending from the wall 224 of the insert 200 is a projection 226 that is centered about a bore 228 extending therethrough such that the projection 226 and the contour of the first, second and third sides 216, 218, 220 are symmetric. As a result, with obvious modifications to the base 114 to accept the insert 200, the insert 200 may be indexable such that multiple cutting edges 230, 232, 234 may be positioned at the lowermost portion 130 of the bottom side 118 of the base 114 and when one cutting edge becomes worn the insert 200 may be rotated such that a second cutting edge is exposed.

The invention is also directed to a method of securing an insert 150 within a tip 100 for demolition and construction equipment comprising the step of providing a common bore 170 through the insert 150 and the walls 136, 137 of the base 114 at each recess 132, 176. Each insert 150, 178 is positioned within its respective recess 132, 176. A fastener 172 is inserted within the common bore 170 and the fastener 172 is then secured against each insert 150, 178 within their respective recess 132, 176.

It should be appreciated that under most circumstances the only maintenance for the tip 100 will be the replacement of the inserts 150, 184. However, it is possible to remove the base 114 from the support 36 to replace the entire tip 100 such that the tip 100 may be considered to be disposable. Furthermore, depending upon the application for which the tip 100 may be used, the material of the base 114 and the material of the tip 100 may be different.

As a result of the tip 100 in accordance with the subject invention, machine down time and the associated expense may be significantly reduced because worn tips may be quickly and easily replaced.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A method of securing inserts within a tip for demolition and construction equipment having a discrete base with a top side, a bottom side and walls therebetween, a mounting surface on the top side of the base adapted to be secured to a support, a central portion with a cutting edge, whereby the cutting edge is defined at the lowermost portion of the bottom side of the base, a recess extending into two opposing walls of the base, wherein each recess defines a recess upper side, an inner wall with a socket extending therein and a recess contours, and an insert having a top side, bottom side and walls therebetween with a cutting edge and a projection integral with the insert and extending from one insert wall and adapted to fit within the recess socket, wherein the method comprises the steps of:
    a) providing a common bore through the insert and the walls of the base at each recess;
    b) positioning an insert within each recess such that the insert projection fits within the recess socket;
    c) inserting a fastener therethrough; and
    d) securing the fastener against each insert within the recess.

2. A tip for demolition and construction equipment comprising:
    a) a discrete base having:
        i) a top side, a bottom side and walls therebetween;
        ii) a mounting surface on the top side of the base adapted to be secured to a support;
        iii) a central portion with a cutting edge, whereby the cutting edge is defined at the lowermost portion of the bottom side of the base; and
        iv) a recess extending into at least one wall of the base, wherein the recess defines a recess upper side, an inner wall and a recess contour;
    b) an insert having:
        i) a top side, a bottom side and walls therebetween;
        ii) a cutting edge defined at the lowermost portion of the bottom side of the insert and generally aligned with the cutting edge of the base; and
        iii) a profile which generally conforms to the recess contour;
    c) wherein an insert is secured within each recess; and
    d) wherein the base further includes a socket extending into the inner wall of the recess and wherein the insert further includes a projection integral with the insert and extending from one insert wall, and wherein the projection fits within the socket to support the insert within the base.

3. The tip in accordance with claim 2, wherein the top side of the insert is positioned against the upper side of the recess.

4. The tip in accordance with claim 2, wherein the recess contour is triangular contour and the tip has a corresponding triangular profile.

5. The tip in accordance with claim 1, wherein the profile of the insert is symmetric and further including cutting edges at the intersection of each pair of walls such that the insert is indexable within the recess to position a cutting edge of the insert in general alignment with the cutting edge of the base.

6. The tip in accordance with claim 2, wherein the socket and projection have matching shapes and are non-circular such when the insert is mounted within the recess there is no relative rotation between the socket and the projection.

7. The tip in accordance with claim 2, further including a common bore extending through the insert walls and at least one base wall and further including a fastener passing through the common bore and securing the insert within the recess of the base.

8. The tip in accordance with claim 7, wherein the fastener is a threaded bolt having a bolt head and threaded shaft, wherein the bore of the insert is countersunk to accept the bolt head and wherein the bore of the base is threaded to accept the threaded shaft.

9. The tip in accordance with claim 7, wherein there is a recess within each wall of the base with an insert positioned within each recess.

10. The tip in accordance with claim 9, wherein the fastener is a threaded bolt having a bolt head and a threaded shaft and wherein the bore of one insert is countersunk to accept the bolt head and the bore of the other insert is threaded to accept the threaded shaft.

11. The tip in accordance with claim 9, wherein the fastener is a nut/bolt arrangement, wherein the bolt head is countersunk within one insert and the nut is countersunk within the other insert to provide a featureless outer surface.

12. An insert for use with a tip for demolition or construction equipment, wherein the tip has a discrete base with a top side, a bottom side and walls therebetween, a mounting surface on the top side of the base adapted to be secured to a support, a central portion with a cutting edge, whereby the cutting edge is defined at the lowermost portion of the bottom side of the base, and a recess extending into at least one side of the base, wherein the recess defines at least a recess upper side, an inner wall with a socket extending therein and a recess contour, wherein the insert comprises a body having:
  a) a top side, a bottom side and walls therebetween, and a projection extending along an axis from one wall and adapted to fit within the base socket;
  b) a cutting edge defined at the intersection of two walls wherein the cutting edge is generally parallel to the axis; and
  c) a shape which conforms to the recess contour.

13. The insert in accordance with claim 12, wherein the projection has a non-circular shape.

14. The insert in accordance with claim 13, wherein the projection is triangular in shape.

15. Demolition and construction equipment having a support and mounted upon the support a tip comprising:
  a) a discrete base having:
    i) a top side, a bottom side and walls therebetween;
    ii) a mounting surface on the top side of the base adapted to be secured to a support;
    iii) a central portion with a cutting edge, whereby the cutting edge is defined at the lowermost portion of the bottom side of the base;
    iv) a recess extending into at least one wall of the base, wherein the recess defines a recess upper side, an inner wall and a recess contour; and
  b) an insert having:
    i) a top side, a bottom side and walls therebetween;
    ii) a cutting edge defined at the lowermost portion of the bottom side of the insert and generally aligned with the cutting edge of the base; and
    iii) a profile which generally conforms to the recess contour;
  c) wherein an insert is secured within each recess; and
  d) wherein the base further includes a socket extending into the inner wall of the recess and wherein the insert further includes a projection integral with the insert and extending from one insert wall, and wherein the projection fits within the socket to support the insert within the base.

16. A tip for demolition and construction equipment comprising:
  a) a discrete base having:
    i) a top side, a bottom side and walls therebetween;
    ii) a mounting surface on the top side of the base adapted to be secured to a support;
    iii) a central portion with a cutting edge, whereby the cutting edge is defined at the lowermost portion of the bottom side of the base; and
    iv) a recess extending into each wall of the base, wherein each recess defines a recess upper side, an inner wall and a recess contour;
  b) an insert secured within each recess, wherein each insert has:
    i) a top side, a bottom side and walls therebetween;
    ii) a cutting edge defined at the lowermost portion of the bottom side of the insert and generally aligned with the cutting edge of the base; and
    iii) a profile which generally conforms to the recess contour; and
  d) wherein the base further includes a socket extending into the inner wall of each recess, wherein each insert further includes a projection integral with that insert and extending from one insert wall, and wherein each insert projection fits within a base socket to support the insert within the base.

* * * * *

UNITED STATES PATENT AND TRADEMARK OFFICE
CERTIFICATE OF CORRECTION

PATENT NO. : 7,044,037 B2  
APPLICATION NO. : 10/829147  
DATED : May 16, 2006  
INVENTOR(S) : Cossette et al.

Page 1 of 1

It is certified that error appears in the above-identified patent and that said Letters Patent is hereby corrected as shown below:

<u>Column 5</u>, Line 46, Claim 1, "contours, and" should read -- contour, and --

<u>Column 6</u>, Line 25, Claim 5, "claim 1" should read -- claim 2 --

<u>Column 8</u>, line 28, Claim 16, "d)" should read -- c) --

Signed and Sealed this

Tenth Day of October, 2006

JON W. DUDAS  
*Director of the United States Patent and Trademark Office*

UNITED STATES PATENT AND TRADEMARK OFFICE
CERTIFICATE OF CORRECTION

PATENT NO. : 7,044,037 B2
APPLICATION NO. : 10/829147
DATED : May 16, 2006
INVENTOR(S) : Cossette et al.

Page 1 of 1

It is certified that error appears in the above-identified patent and that said Letters Patent is hereby corrected as shown below:

<u>Title Page</u>, See Item (75), Inventors: "Marc A. Cossette, Poland, OH (US); John R. Ramun, 8243 N. Lima Rd., Poland, OH (US) 44514" should be reversed and should read -- John R. Ramun, 8243 N. Lima Rd., Poland, OH (US) 44514;
Marc A. Cossette, Poland, OH (US) --

Signed and Sealed this

Twentieth Day of February, 2007

JON W. DUDAS
*Director of the United States Patent and Trademark Office*